(12) United States Patent
Dang (10) Patent No.: US 12,013,744 B2
(45) Date of Patent: Jun. 18, 2024

(54) ELECTROSTATIC INTERFERENCE PROCESSING METHOD, APPARATUS, AND DEVICE, AND READABLE STORAGE MEDIUM

(71) Applicant: INSPUR SUZHOU INTELLIGENT TECHNOLOGY CO., LTD., Jiangsu (CN)

(72) Inventor: Jie Dang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/259,726

(22) PCT Filed: Nov. 30, 2021

(86) PCT No.: PCT/CN2021/134430
§ 371 (c)(1),
(2) Date: Jun. 28, 2023

(87) PCT Pub. No.: WO2023/035426
PCT Pub. Date: Mar. 16, 2023

(65) Prior Publication Data
US 2024/0036959 A1   Feb. 1, 2024

(30) Foreign Application Priority Data
Sep. 7, 2021   (CN) .......................... 202111040872.7

(51) Int. Cl.
*G06F 11/00*   (2006.01)
*G06F 11/07*   (2006.01)
*G06F 11/14*   (2006.01)

(52) U.S. Cl.
CPC ........ *G06F 11/073* (2013.01); *G06F 11/0706* (2013.01); *G06F 11/0721* (2013.01); *G06F 11/0757* (2013.01); *G06F 11/1441* (2013.01)

(58) Field of Classification Search
CPC .............. G06F 11/073; G06F 11/0706; G06F 11/0721; G06F 11/0757; G06F 11/1441
See application file for complete search history.

(56) References Cited

U.S. PATENT DOCUMENTS

| | | | | |
|---|---|---|---|---|
| 4,956,842 A | * | 9/1990 | Said | ..................... G06F 11/2215 714/41 |
| 5,528,756 A | * | 6/1996 | Molnar | ............... G06F 11/0757 714/E11.005 |

(Continued)

FOREIGN PATENT DOCUMENTS

| CN | 106294048 A | 1/2017 |
|---|---|---|
| CN | 106951850 A | 7/2017 |

(Continued)

OTHER PUBLICATIONS

International Search Report and Written Opinion received for PCT Serial No. PCT/CN2021/134430 on Jun. 10, 2022, 9 pgs.

(Continued)

*Primary Examiner* — Joshua P Lottich
(74) *Attorney, Agent, or Firm* — Merchant & Gould P.C.

(57) ABSTRACT

An electrostatic interference processing method, apparatus, and device, and a readable storage medium are provided. The method includes: receiving input data in real time, and determining whether an electrostatic interference signal is present in the input data; in response to determining that the electrostatic interference signal is present in the input data, interrupting reception of the input data; determining whether an interference frequency of the electrostatic interference signal is lower than a preset value; and in response to determining that the interference frequency of the electro- (Continued)

static interference signal is lower than the preset value, continuing to receive the input data.

20 Claims, 6 Drawing Sheets

(56) References Cited

U.S. PATENT DOCUMENTS

| | | | |
|---|---|---|---|
| 6,292,045 B1 * | 9/2001 | Bongiorno | G06F 1/08 |
| | | | 714/E11.003 |
| 6,658,597 B1 * | 12/2003 | Ker | G06F 11/24 |
| | | | 714/E11.154 |
| 2004/0264095 A1 | 12/2004 | Block | |
| 2010/0077281 A1 * | 3/2010 | Bae | H03M 13/09 |
| | | | 714/E11.032 |
| 2010/0208399 A1 | 8/2010 | Yu | |
| 2013/0285668 A1 | 10/2013 | Savich | |
| 2022/0066868 A1 * | 3/2022 | Betz | G06F 11/076 |

FOREIGN PATENT DOCUMENTS

| | | |
|---|---|---|
| CN | 109040648 A | 12/2018 |
| CN | 109342859 A | 2/2019 |
| CN | 109739692 A | 5/2019 |
| CN | 109766067 A | 5/2019 |
| CN | 110164392 A | 8/2019 |
| CN | 111506168 A | 8/2020 |
| CN | 112783354 A | 5/2021 |
| CN | 112821370 A | 5/2021 |
| CN | 113505013 A | 10/2021 |

OTHER PUBLICATIONS

Search Report received for CN Serial No. 2021110408727 on Oct. 21, 2021, 3 pgs.

* cited by examiner

ELECTROSTATIC INTERFERENCE PROCESSING METHOD, APPARATUS, AND DEVICE, AND READABLE STORAGE MEDIUM

The present application is a National Stage Filing of PCT International Application No. PCT/CN2021/134430 filed on Nov. 30, 2021, which claims priority to the Chinese patent application No. 202111040872.7, filed before the China National Intellectual Property Administration (CNIPA) on Sep. 7, 2021, which is incorporated herein by reference in its entirety.

TECHNICAL FIELD

The present disclosure relates to the technical field of electrostatic treatment, and in particular relates to an electrostatic interference processing method, apparatus, and device, and a readable storage medium.

BACKGROUND

Electrostatic discharge is a common hazard in electronic industry, which not only causes damage to hardware of electronic products, but also interferes with the normal execution of server programs.

At present, the electrostatic protection technology adopted in the related art is based on hardware protection, that is, to prevent electrostatic interference from entering a core part of a motherboard as much as possible. Although this greatly reduces the loss of hardware caused by static electricity, the electrostatic interference after the treatment is still likely to interfere with the normal execution of server programs. In order to prevent electrostatic interference from damaging server programs and internal chips, once electrostatic interference is detected, a processor of a server may carry out stress response such as triggering a crash, which causes the server to operate abnormally and brings huge losses to a user of the server.

To sum up, a technical problem that urgently needs to be resolved currently by persons having ordinary skill in the art is how to reduce impact of electrostatic interference on the operation of a server.

SUMMARY

In view of this, the embodiments of the present disclosure provide an electrostatic interference processing method, apparatus, and device, and a readable storage medium, which may reduce impact of electrostatic interference on the operation of a server.

The embodiments of the present disclosure provide the following technical solutions.

An electrostatic interference processing method is provided and includes:

receiving input data in real time, and determining whether an electrostatic interference signal is present in the input data;

in response to determining that the electrostatic interference signal is present in the input data, interrupting reception of the input data, and determining whether an interference frequency of the electrostatic interference signal is lower than a preset value; and in response to determining that the interference frequency of the electrostatic interference signal is lower than the preset value, continuing to receive the input data.

In some exemplary embodiments, after continuing to receive the input data, the method may further include:

determining whether the electrostatic interference signal in the input data causes a processor to fall into an infinite loop, and in response to determining that the electrostatic interference signal in the input data causes the processor to fall into the infinite loop, controlling the processor to reset so as to exit the infinite loop.

In some exemplary embodiments, in response to determining that the electrostatic interference signal in the input data does not cause the processor to fall into the infinite loop, the method may further include:

determining whether the electrostatic interference signal in the input data causes an error in a data bit of a memory; and in response to determining that the electrostatic interference signal in the input data causes an error in the data bit of the memory, calibrating the memory.

In some exemplary embodiments, after controlling the processor to reset so as to exit the infinite loop, the method may further include:

proceeding to the operation of determining whether the electrostatic interference signal in the input data causes an error in the data bit of the memory.

In some exemplary embodiments, determining whether the interference frequency of the electrostatic interference signal is lower than the preset value includes:

setting a current counting time of a timer to 0, and reading a set of the input data;

reading a next set of the input data when the current counting time is equal to a preset time interval;

determining whether two adjacent sets of the input data read are the same;

in response to determining that the two adjacent sets of the input data are different, returning to the operation of setting the current counting time of the timer to 0; and in response to determining that the two adjacent sets of the input data are the same, determining whether the current counting time is less than a preset multiple of the preset time interval;

in response to determining that the current counting time is less than the preset multiple of the preset time interval, when the current counting time is equal to an integer multiple of the preset time interval, returning to the operation of reading the next set of the input data; and in response to determining that the current counting time is not less than the preset multiple of the preset time interval, determining that the interference frequency of the electrostatic interference signal is lower than the preset value.

In some exemplary embodiments, determining whether the electrostatic interference signal in the input data causes the processor to fall into the infinite loop includes:

determining whether the current counting time of the timer varies; in response to determining that the current counting time of the timer varies, determining that the electrostatic interference signal does not cause the processor to fall into the infinite loop; and in response to determining that the current counting time of the timer does not vary, determining that the electrostatic interference signal causes the processor to fall into the infinite loop.

In some exemplary embodiments, the input data is control signal data.

An electrostatic interference processing apparatus is provided and includes:

a receiving module, configured to receive input data in real time, and determine whether an electrostatic interference signal is present in the input data;

a first determining module, configured to, in response to determining that the electrostatic interference signal is present in the input data, interrupt reception of the input data, and determine whether an interference frequency of the electrostatic interference signal is lower than a preset value; and a second determining module, configured to continue to receive the input data in response to determining that the interference frequency of the electrostatic interference signal is lower than the preset value;

An electrostatic interference processing device is provided and includes:

a memory, configured to store a computer program; and a processor, configured to implement operations of the electrostatic interference processing method according to any one of the above when executing the computer program.

A readable storage medium is provided, where the readable storage medium has a computer program stored therein, and the computer program, when executed by a processor, causes the processor to implement operations of the electrostatic interference processing method according to any one of the above.

The embodiments of the present disclosure provide an electrostatic interference processing method, apparatus, and device, and a readable storage medium. The method includes: receiving input data in real time, and determining whether an electrostatic interference signal is present in the input data; in response to determining that the electrostatic interference signal is present in the input data, interrupting reception of the input data; determining whether an interference frequency of the electrostatic interference signal is lower than a preset value; and in response to determining that the interference frequency of the electrostatic interference signal is lower than the preset value, continuing to receive the input data.

According to the above technical solutions provided in the embodiments of the present disclosure, the reception of the input data is interrupted when an electrostatic interference signal is detected; when it is determined that the interference frequency of the electrostatic interference signal is lower than the preset value, the reception of the input data is continued. In the related art, when detecting electrostatic interference, stress measures such as directly refusing to receive data and directly triggering a crash are taken, as a result, the server cannot operate normally. By contrast, the technical solution provided in the embodiments of the present disclosure enables a server to have fault tolerance to an electrostatic interference signal with a low interference frequency by normally receiving input data having an electrostatic interference signal with a low interference frequency, that is, the server is controlled not to take stress measures such as directly refusing the input data having the electrostatic interference signal with low interference frequency and directly triggering a crash, but normally receives the input data having the electrostatic interference signal with low interference frequency, ensuring the server to operate normally in case of an electrostatic interference signal with a low frequency, which may improve operation stability of the server and reduce loss caused by electrostatic interference to a user of the server.

BRIEF DESCRIPTION OF THE DRAWINGS

To describe the technical solutions in the embodiments of the present disclosure or in the related art more clearly, the following briefly describes the accompanying drawings required for describing the embodiments or the related art. Apparently, the accompanying drawings in the following description show merely the embodiments of the present disclosure, and a person having ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person having ordinary skill in the art based on the embodiments of the present disclosure and without creative efforts shall fall within the protection scope of the present disclosure.

Figure 1:
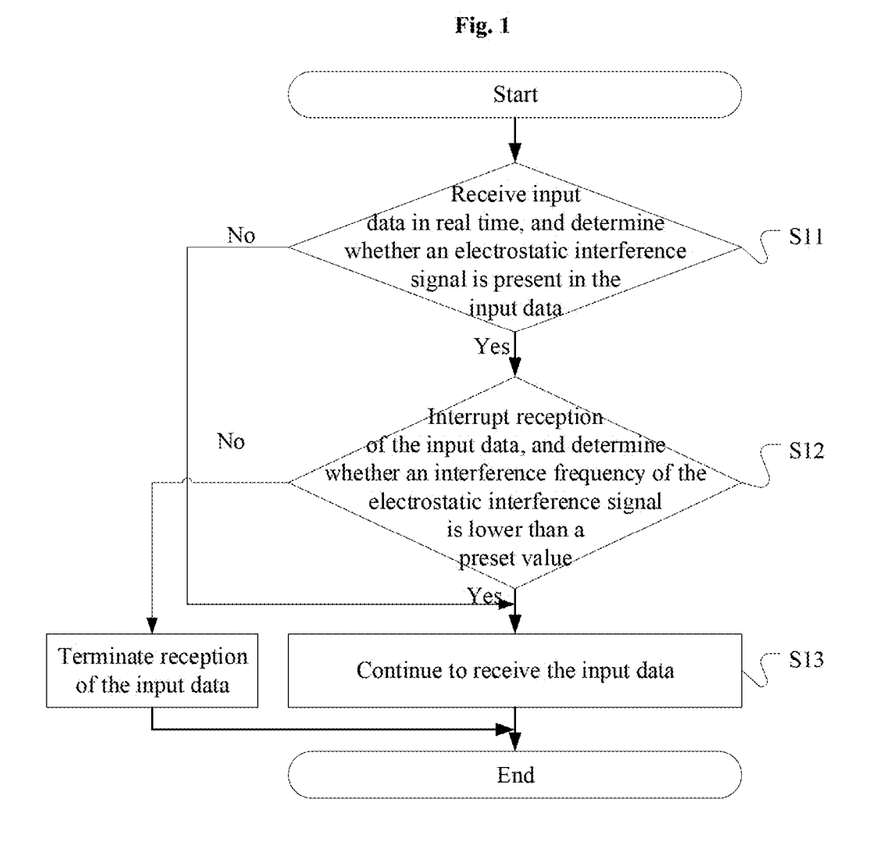
FIG. 1 is a flowchart of an electrostatic interference processing method according to the embodiments of the present disclosure.

Refer to FIG. 1. FIG. 1 is a flowchart of an electrostatic interference processing method according to the embodiments of the present disclosure. An electrostatic interference processing method provided by the embodiments of the present disclosure includes operations S11 to S13 which are described in detail below.

At S11, input data are received in real time, and whether an electrostatic interference signal is present in the input data is determined; in response to determining that the electrostatic interference signal is present in the input data, the flow proceeds to operation S12; and in response to determining that the electrostatic interference signal is not present in the input data, continue to receive the input data.

In the embodiments of the present disclosure, when a server operates normally, the server may receive input data from the outside in real time and at the same time determine whether an electrostatic interference signal is present in the input data. In some exemplary implementations, the electrostatic interference signal in the embodiments of the present disclosure may be an interference pulse signal. When it is determined that the electrostatic interference signal is present in the input data received in real time, the flow proceeds to operation S12; and when it is determined that the electrostatic interference signal is not present (i.e., is absent) in the input data received in real time, continue to receive the input data. It should be noted that the input data received is sent to relevant chips of the processor of the server, so that the chips may accordingly process the input data.

In the embodiments of the present disclosure, an interference detector may be used to detect the electrostatic interference signal, in other words, data received by the server passes through the interference detector and then the interference detector detects whether the electrostatic interference signal is present in the input data; and when the electrostatic interference signal is absent in the input data, the interference detector sends data received to relevant chips of the processor of the server for processing. The interference detector may be realized by, for example, a peripheral circuit of the processor or an internal circuit of the processor. In short, it is only necessary to ensure that the input data first passes through the interference detector.

It should be noted that the processor of the server mentioned in the embodiments of the present disclosure may be a microprocessor or a processor in other form. This is not limited in the embodiments of the present disclosure.

At S12, reception of the input data is interrupted, and whether an interference frequency of the electrostatic interference signal is lower than a preset value is determined; in response to determining that the interference frequency of the electrostatic interference signal is lower than the preset value, the flow proceeds to operation S13; and in response to determining that the interference frequency of the electrostatic interference signal is not lower than the preset value, reception of the input data is terminated.

In response to determining that the electrostatic interference signal is present in the input data, the reception of the input data is cut off to interrupt the reception, and whether an interference frequency of the electrostatic interference signal is lower than a preset value is determined. The interference frequency refers to the number of electrostatic interference signals per unit time. In the related art, when detecting an electrostatic interference signal, stress measures such as directly refusing to receive data and directly triggering a crash are taken. By contrast, in the embodiments of the present disclosure, when it is determined that the electrostatic interference signal is present in the input data, the reception of the input data is interrupted, whether the interference frequency of the electrostatic interference signal is lower than the preset value is determined, and then countermeasures are taken depending on the result of the determination, so as to avoid failure to normally operate the server caused by stress response such as direct crash when the electrostatic interference signal is determined to be present.

In response to determining that the interference frequency of the electrostatic interference signal is higher than the preset value, the electrostatic interference signal has relatively large hazard to the processor. In this case, in order to ensure the security, the server has a high probability of stress response such as crash and restart.

At S13, the flow proceeds to continuing to receive the input data.

When determining that the interference frequency of electrostatic interference signal is lower than the preset value, this indicates a relatively low interference frequency of electrostatic interference signal, and such electrostatic interference has relatively small hazard to the server and the processor, and is not likely to cause damage to hardware. Since the hazard of the electrostatic interference with low interference frequency is relatively small, the server may continue to receive the input data in real time and accordingly process the input data, rather than taking stress response to the electrostatic interference. In other words, the server may continue to receive the input data normally and operate normally in case of the electrostatic interference signal with low interference frequency. Under such circumstances, the server does not have any stress response such as crash, which may not only enable the server to process the input data currently received, but also avoid the interruption of the original operation on the server, thereby improving the operation stability and reliability of the server.

It may be learned from the foregoing process that the above technical solution provided in the embodiments of the present disclosure enables the server to receive the input data having the electrostatic interference signal with low interference frequency without stress response such as crash, so that the server has a fault-tolerant mechanism for the electrostatic interference signal with low interference frequency, thereby ensuring the normal operation of the server, improving the operation stability of the server system, and reducing the economic loss caused by the electrostatic interference to a user of the server.

According to the above technical solutions provided in the embodiments of the present disclosure, the reception of the input data is interrupted when an electrostatic interference signal is detected; when it is determined that the interference frequency of the electrostatic interference signal is lower than the preset value, the reception of the input data is continued. In the related art, when detecting electrostatic interference, stress measures such as directly refusing to receive data and directly triggering a crash are taken, as a result, the server cannot operate normally. By contrast, the technical solution provided in the embodiments of the present disclosure enables a server to have fault tolerance to an electrostatic interference signal with a low interference frequency by normally receiving input data having an electrostatic interference signal with a low interference frequency, that is, the server is controlled not to take stress measures such as directly refusing the input data having the electrostatic interference signal with low interference frequency and directly triggering a crash, but normally receives the input data having the electrostatic interference signal with low interference frequency, ensuring the server to operate normally in case of an electrostatic interference signal with a low frequency, which may improve operation stability of the server and reduce loss caused by electrostatic interference to a user of the server.

Figure 2:
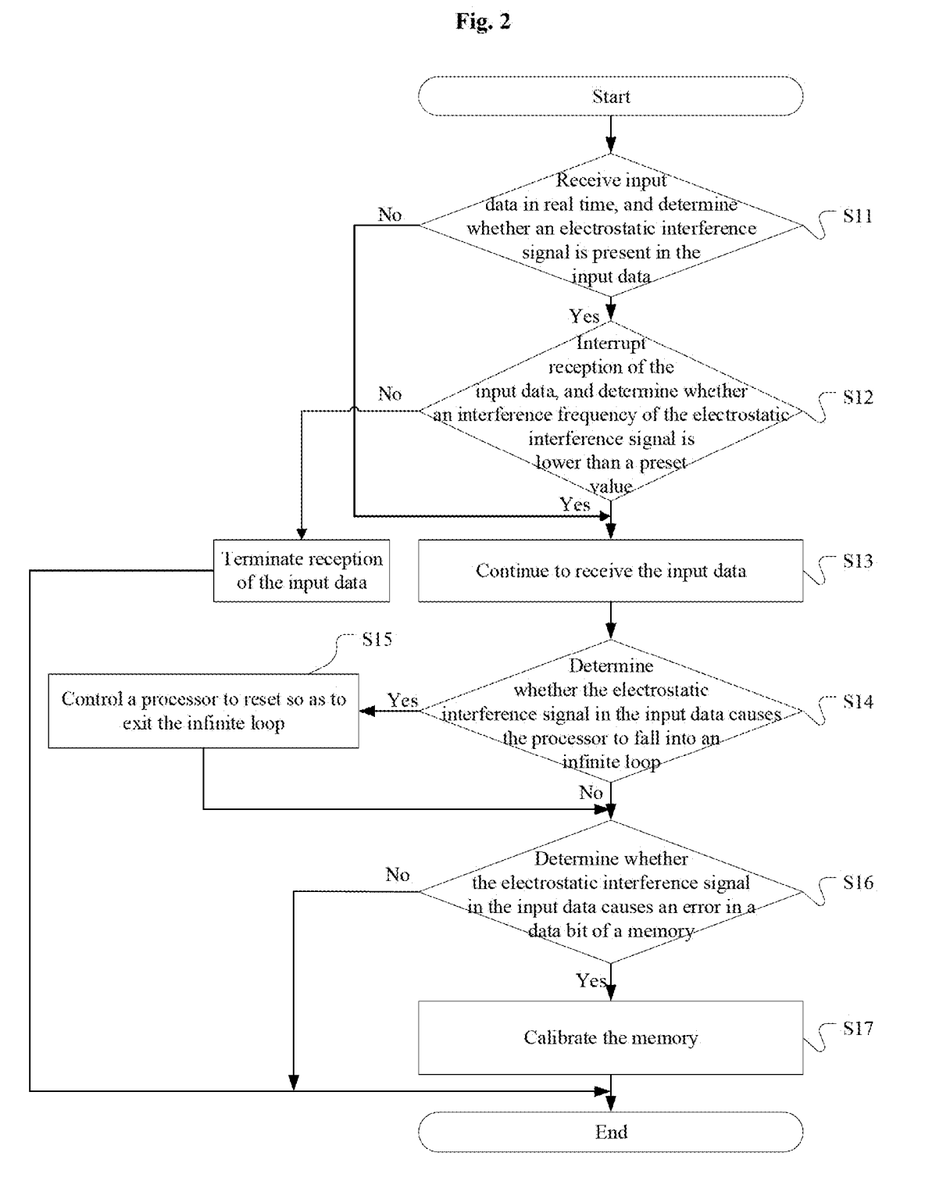
FIG. 2 is a flowchart of another electrostatic interference processing method according to the embodiments of the present disclosure.

Refer to FIG. 2. FIG. 2 is a flowchart of another electrostatic interference processing method according to the embodiments of the present disclosure. After the input data continues to be received, the electrostatic interference processing method according to the embodiments of the present disclosure may further include operations S14 and S15.

At S14, whether the electrostatic interference signal in the input data causes the processor to fall into an infinite loop is determined; and when the electrostatic interference signal in the input data causes the processor to fall into the infinite loop, the flow proceeds to operation S15.

At S15, the processor is controlled to reset so as to exit the infinite loop.

After it is determined that the electrostatic interference signal with the low frequency is present in the input data and the input data continues to be received, although the interference frequency of the electrostatic interference signal in the input data is relatively low, there is a probability that the processor falls into an infinite loop. Therefore, after the input data continues to be received, it may be determined whether the electrostatic interference signal in the input data received by the server causes the processor to fall into the infinite loop. In some exemplary implementations, when the processor is not in an infinite loop before the server continues to receive the input data, but falls into the infinite loop after the server continues to receive the input data, it may be determined that the electrostatic interference signal in the input data received causes the processor to fall into the infinite loop. In this case, the processor may be controlled to reset. In some exemplary implementations, a reset circuit may be used to send a reset signal to force the processor to reset, so that the processor exits the infinite loop and returns to normal operation, further ensuring the operation reliability and stability of the server.

Refer to FIG. 2. In response to determining that the electrostatic interference signal in the input data does not cause the processor to fall into the infinite loop, the electrostatic interference processing method according to the embodiments of the present disclosure may further include operations S16 and S17.

At S16, whether the electrostatic interference signal in the input data causes an error in a data bit of a memory is determined; and in response to determining that the input data causes the error in the data bit of the memory, the flow proceeds to operation S17.

At S17, the memory is calibrated.

Considering that the electrostatic interference signal with low interference frequency in the input data received may interfere with data in the memory and cause change of data in the memory without causing the processor to fall into the infinite loop, when performing operation S14 to determine whether the input data received causes the processor to fall into the infinite loop, in response to determining that the electrostatic interference signal in the input data does not cause the processor to fall into the infinite loop, it may be further determined whether the electrostatic interference signal in the input data causes the error in the data bit of the memory. In some exemplary implementations, a parity check method may be used to perform parity check on storage bits of the memory to determine whether the electrostatic interference signal interferes with the memory and causes the error in the data bit of the memory. In response to determining that the error occurs in the data bit of the memory, the processor is controlled to calibrate the memory. After such calibration is completed, the server program may restore to normal execution. In response to determining that no error occurs in the data bit of the memory, this indicates that the electrostatic interference signal does not interfere with data in the memory, and the server program is normal, so the operation of the server program may be maintained at this time.

The parity check method is a method to check according to whether the number of "1" in digits of a set of transmitted binary codes is odd or even. The check according to whether the number of "1" in digits of a set of transmitted binary codes is an odd number is called odd parity check, whereas the check according to whether the number of "1" in digits of a set of transmitted binary codes is an even number is called even parity check. The kind of check adopted is specified in advance. Usually, a parity check bit is set at a transmitter to make the number of "1" in the set of codes odd or even. If odd parity check is adopted, whether the number of "1" in digits of the set of codes is odd is checked when a receiver receives these digits, thereby determining the correctness of transmitted codes. In a word, the numbers of "1" in the transmitter and the receiver should have the same parity. Further, in the embodiments of the present disclosure, the number of the parity check bits may be set according to requirements. With the increase of the number of the parity check bits, the check accuracy greatly increases. Of course, when the number of the parity check bits is set to 1, the check accuracy is the lowest.

Data bits in the memory may be determined and calibrated to ensure the correctness of data in the memory, so that the server may operate normally, thereby improving operation stability of the server.

After the processor is controlled to reset so as to exit the infinite loop, the electrostatic interference processing method according to the embodiments of the present disclosure may further include the following operation.

The flow proceeds to the operation of determining whether the electrostatic interference signal in the input data causes an error in the data bit of the memory.

Refer to FIG. 2, in the embodiments of the present disclosure, after the processor is controlled to exit the infinite loop, the electrostatic interference signal in the input data may still interfere with and cause change in data in the memory. Therefore, in the embodiments of the present disclosure, operation S16 may be executed after operation S15, that is, whether the electrostatic interference signal in the input data causes the error in the data bit of the memory may continue to be determined to timely find and correct the error, so that the server program may automatically restore to normal execution as soon as possible, further improving the operation stability of the server.

Figure 3:
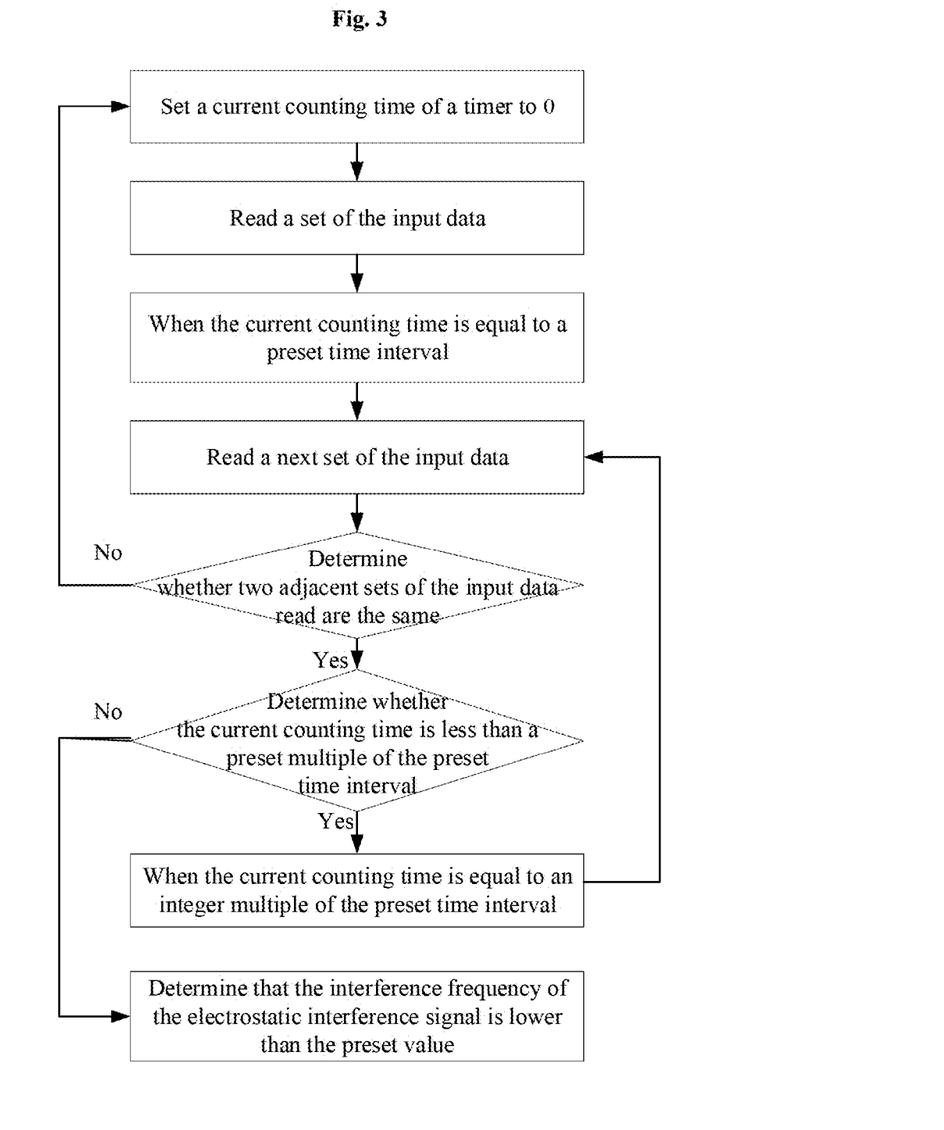
FIG. 3 is a flowchart of an exemplary implementation of operation S12 in FIG. 1.

Refer to FIG. 3. FIG. 3 is a flowchart of an exemplary implementation of operation S12 in FIG. 1. In the electrostatic interference processing method according to the embodiments of the present disclosure, the operation of determining whether the interference frequency of the electrostatic interference signal is lower than the preset value may include the following operations.

A current counting time of a timer is set to 0, and a set of the input data is read.

A next set of the input data is read when the current counting time is equal to a preset time interval.

Whether two adjacent sets of the input data read are the same is determined.

In response to determining that the two adjacent sets of the input data are different, the flow returns to the operation that the current counting time of the timer is set to 0.

In response to determining that the two adjacent sets of the input data are the same, whether the current counting time is less than a preset multiple of the preset time interval is determined.

In response to determining that the current counting time is less than the preset multiple of the preset time interval, when the current counting time is equal to an integer multiple of the preset time interval, the flow returns to the operation that the next set of the input data is read.

In response to determining that the current counting time is not less than the preset multiple of the preset time interval, it is determined that the interference frequency of the electrostatic interference signal is lower than the preset value.

In the embodiments of the present disclosure, a periodic pulse generator may be used as a timer for timing. In some exemplary implementations, a periodic pulse generator integrated in the processor may be used as the timer. Of course, a peripheral circuit of the processor may be also used as the timer.

1) When it is determined that the electrostatic interference signal is present in the input data, the timer may be started and the current counting time t of the timer is set to 0. In this case, a set of input data may be read. It should be noted that the input data read here is only used to determine presence or absence of the electrostatic interference signal, rather than being sent to relevant chips of the processor.

Figure 4:
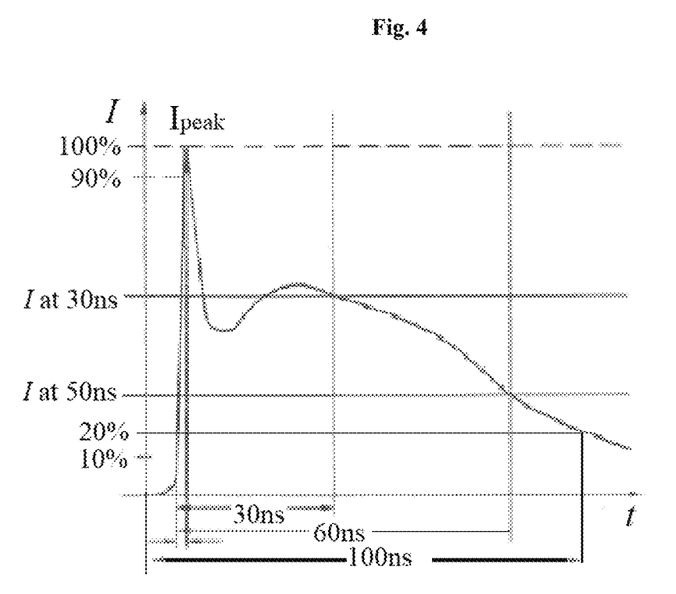
FIG. 4 is a schematic diagram of an electrostatic interference signal according to the embodiments of the present disclosure.

2) The timer sends out a pulse signal after the preset time interval T. In this case, a next set of input data may be read at t=T, that is, the transmission interval of the pulse signal is the preset time interval T. Once the pulse signal is sent out, a set of input data may be read. The value of the preset time interval T may be determined with reference to FIG. 4, which is a schematic diagram of an electrostatic interference signal according to the embodiments of the present disclosure. It may be seen from the figure that the rise time of the electrostatic interference signal is 0.7 ns, and energy decreases by about 80% when the duration reaches 100 ns. In order to shorten the elimination time of the electrostatic interference and the interruption time of the reception of the input data as much as possible so as to avoid the affection on the operation of the server, the preset time interval T may be set to be greater than 100 ns, for example, the preset time interval T may be set to 200 ns.

3) After a set of input data is read at t=T, the set of input data read last time is compared with the set of input data at this moment to determine whether the two sets of input data are the same. In response to determining that the two sets of input data are inconsistent, this indicates the program may be interfered by the electrostatic interference signal. In response to determining that the two sets of input data are consistent, this indicates that the program is not interfered by the electrostatic interference signal. Considering that a digital signal itself may jump occasionally, N (which represents a preset multiple) sets of data may be continuously read to prevent a determining error, and two adjacent sets of data are respectively compared and such comparison may be carried out by a total of (N−1) times. In addition, in order to shorten the detection and determining time as much as possible, it is suggested to take a low value of N. According to the holding time of common data signals, a comparative analysis on a large number of experimental data shows that N=4 is relatively appropriate, that is, the preset multiple may be equal to 4.

4) In response to determining that two adjacent sets of input data read are different, this indicates that at least one set of the two adjacent sets of input data is interfered, and timing needs to be restarted. In this case, the flow proceeds to the operation that the current counting time of the timer is set to 0, that is, t is reset to 0.

5) In response to determining that the two adjacent sets of input data read are the same, whether the current counting time T is less than NT is determined.

6) When t is less than NT, the input data may continue to be read and determined to prevent a determining error. In some exemplary implementations, the timer sends out the pulse signal after the preset time interval T. In this case, when the current counting time is equal to an integer multiple of the preset time interval, namely t=nT (n is an integer greater than 1 and less than N), a next set of input data is read, that is, the flow proceeds to the operation that the next set of the input data is read.

7) If t is not less than NT, this indicates that consecutive n sets of input data read are all the same and not affected by the electrostatic interference signal. In this case, it may be considered that the interference frequency of the electrostatic interference signal in the input data is relatively low, that is, it may be determined that the interference frequency of the electrostatic interference signal is lower than the preset value.

The above process may improve the determining accuracy of the interference frequency of the electrostatic interference signal, thereby helping improve the operation stability and reliability of a server.

In the electrostatic interference processing method according to the embodiments of the present disclosure, the operation of determining whether the electrostatic interference signal in the input data causes the processor to fall into the infinite loop may include the following sub-operations.

Whether the current counting time of the timer varies is determined. In response to determining that the current counting time of the timer varies, it is determined that the electrostatic interference signal does not cause the processor to fall into the infinite loop. In response to determining that the current counting time of the timer does not vary, it is determined that the electrostatic interference signal causes the processor to fall into the infinite loop.

In the embodiments of the present disclosure, when the periodic pulse generator integrated in the processor is used as the timer, whether the electrostatic interference signal in the input data causes the processor to fall into the infinite loop may be determined through determining whether the current counting time of the timer varies. In response to determining that the current counting time of the timer varies, it is determined that the processor does not fall into the infinite loop, that is, it is determined that the electrostatic interference signal in the input data does not cause the processor to fall into the infinite loop. In response to determining that the current counting time of the timer does not vary, it is determined that the processor falls into the infinite loop, that is, it is determined that the electrostatic interference signal in the input data causes the processor to fall into the infinite loop.

The determination performed based on the current counting time of the timer may improve the convenience and accuracy of determining whether the processor falls into the infinite loop.

In addition, on the basis of this embodiment, in response to determining that the electrostatic interference signal does not cause the processor to fall into the infinite loop, the timer may be controlled to continue timing, and the flow proceeds to the operation of determining whether an electrostatic interference signal is present in the input data, so that the input data may be detected and determined in real time during reception, thereby helping improve the operation stability of a server.

Figure 5:
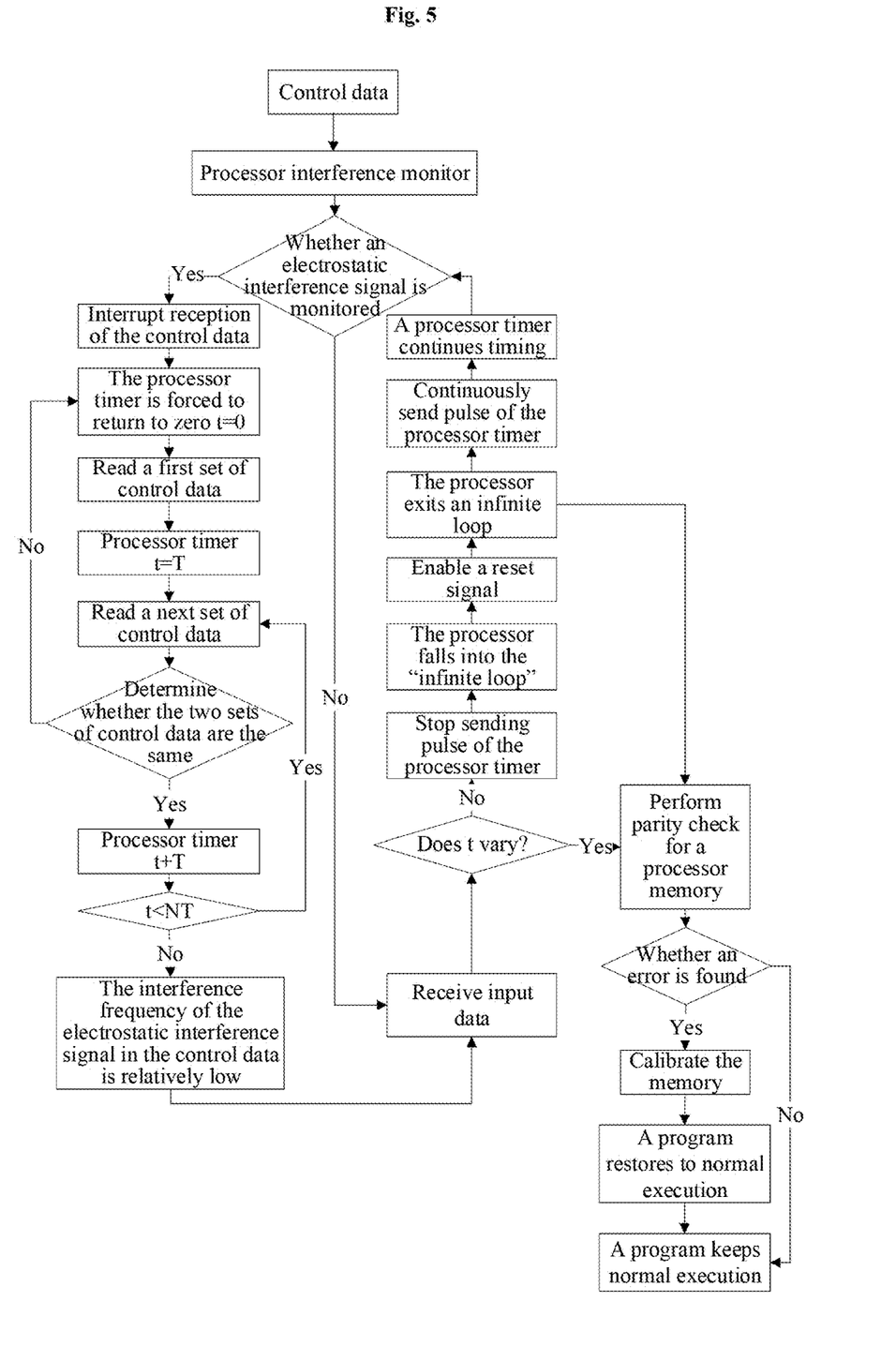
FIG. 5 is a flowchart of still another electrostatic interference processing method according to the embodiments of the present disclosure.

Refer to FIG. 5. FIG. 5 is a flowchart of still another electrostatic interference processing method according to the embodiments of the present disclosure. In the electrostatic interference processing method according to the embodiments of the present disclosure, the input data is control signal data.

In the embodiments of the present disclosure, considering that stored information will not be lost when the control signal data is interrupted, and the control signal data being interrupted for a very short time will hardly affect the program execution of the server, the program may restore to normal execution after the interrupted control signal data restores to normal. However, the control signal data is very sensitive to the electrostatic interference signal, and the control signal data interfered by the electrostatic interference signal is easy to cause the processor to fall into the infinite loop. Therefore, the control signal data may undergo electrostatic interference treatment, that is, the input data mentioned in the embodiments of the present disclosure may be control signal data, thereby reducing impact of the electrostatic interference on the server program and improving the operation stability and reliability of the server.

In addition, considering that stored information will be lost when storage signal data (that is, received signals of the processor may be simply divided into control signal data and storage signal data; the control signal data refers to timing signal, reset signal, interruption request signal, bus request signal, equipment ready signal, and the like all which play a control role; the storage signal data refers to signal to record the stored information) is interrupted, resulting in data loss. The storage signal data may not be interrupted, that is, the storage signal data may be received when the normal operation of the server is determined. In addition, after the server receives the storage signal data, whether the current counting time t of the timer (that is, the periodic pulse generator integrated in the processor is used as the timer) in the processor varies may be determined. In response to determining that the current counting time t of the timer varies, it is determined that the processor does not fall into the infinite loop, and then whether an error occurs in the data bit of the memory (in some exemplary implementations, a parity check method may be used for determining) may be determined. When the error occurs in the data bit of the memory, this indicates that the electrostatic interference signal may be present in the stored signal data and cause interference to the data in the memory, and the memory may be calibrated. When no error occurs in the data bit of the memory, this indicates that no electrostatic interference signal is present in the stored data or the electrostatic interference signal is present but does not interfere with the data in the memory, and the program is maintained. In response to determining that the current counting time t of the timer does not vary, it is determined that the processor falls into the infinite loop, indicating that the electrostatic interference signal is present in the stored signal data and affects the operation of the processor. In this case, a reset circuit may be used to reset the processor, so that the processor exits the infinite loop, and then the flow proceeds to the operation of determining whether an error occurs in the data bit of the memory after the processor exits the infinite loop.

Figure 6:
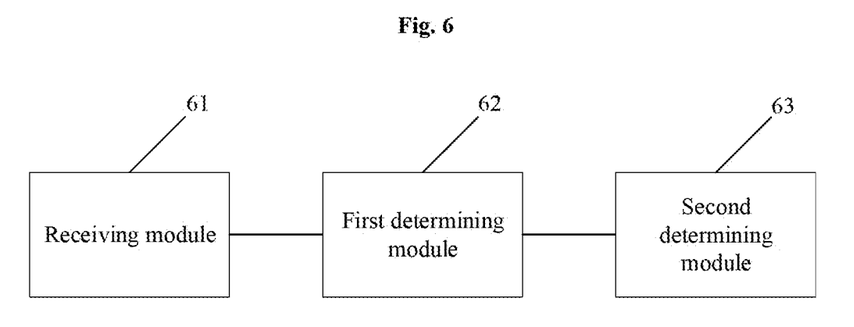
FIG. 6 is a schematic structural diagram of an electrostatic interference processing apparatus according to the embodiments of the present disclosure.

An embodiment of the present disclosure further provides an electrostatic interference processing apparatus. Refer to FIG. 6. FIG. 6 is a schematic structural diagram of an electrostatic interference processing apparatus according to the embodiments of the present disclosure. The electrostatic interference processing apparatus may include:
- a receiving module 61, configured to receive input data in real time, and determine whether an electrostatic interference signal is present in the input data;
- a first determining module 62, configured to, in response to determining that the electrostatic interference signal is present in the input data, interrupt reception of the input data, and determine whether an interference frequency of the electrostatic interference signal is lower than a preset value; and
- a second determining module 63, configured to continue to receive the input data in response to determining that the interference frequency of the electrostatic interference signal is lower than the preset value.

The electrostatic interference processing apparatus according to the embodiments of the present disclosure may further include:
- a third determining module, configured to determine whether the electrostatic interference signal in the input data causes a processor to fall into an infinite loop after continuing to receive the input data, and control the processor to reset so as to exit the infinite loop in response to determining that the electrostatic interference signal in the input data causes the processor to fall into the infinite loop.

The electrostatic interference processing apparatus according to the embodiments of the present disclosure may further include:
- a fourth determining module, configured to determine whether the electrostatic interference signal in the input data causes an error in a data bit of a memory in response to determining that the electrostatic interference signal in the input data does not cause a processor to fall into an infinite loop; and
- a calibration module, configured to calibrate the memory in response to determining that the electrostatic interference signal in the input data causes the error in the data bit of the memory.

The electrostatic interference processing apparatus according to the embodiments of the present disclosure may further include:
- an execution module, configured to proceed to the operation of determining whether the electrostatic interference signal in the input data causes an error in the data bit of the memory after the processor is controlled to reset so as to exit the infinite loop.

In the electrostatic interference processing apparatus according to the embodiments of the present disclosure, the first determining module 62 may further include:
- a first reading unit, configured to set a current counting time of a timer to 0, and read a set of the input data;
- a second reading unit, configured to read a next set of the input data when the current counting time is equal to a preset time interval;
- a first determining unit, configured to determine whether two adjacent sets of the input data read are the same;
- a first return unit, configured to return to the operation of setting the current counting time of the timer to 0 in response to determining that the two adjacent sets of the input data are different;
- a second determining unit, configured to determine whether the current counting time is less than a preset multiple of the preset time interval in response to determining that the two adjacent sets of the input data are the same;
- a second return unit, configured to, in response to determining that the current counting time is less than the preset multiple of the preset time interval, when the current counting time is equal to an integer multiple of the preset time interval, return to the operation of reading the next set of the input data; and
- a determining unit, configured to, in response to determining that the current counting time is not less than the preset multiple of the preset time interval, determine that the interference frequency of the electrostatic interference signal is lower than the preset value.

In the electrostatic interference processing apparatus according to the embodiments of the present disclosure, the third determining module may further include:
- a third determining unit, configured to determine whether the current counting time of the timer varies; in response to determining that the current counting time of the timer varies, determine that the electrostatic interference signal does not cause the processor to fall into the infinite loop; and in response to determining that the current counting time of the timer does not vary, determine that the electrostatic interference signal causes the processor to fall into the infinite loop.

In the electrostatic interference processing apparatus according to the embodiments of the present disclosure, the input data is control signal data.

Figure 7:
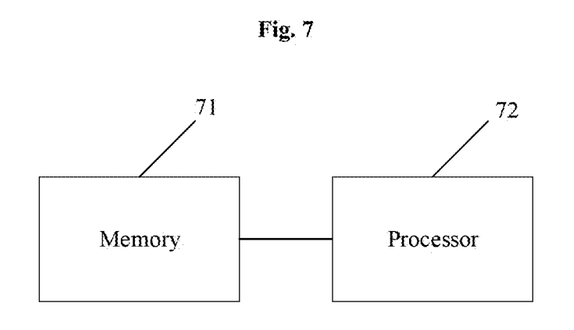
FIG. 7 is a schematic structural diagram of an electrostatic interference processing device according to the embodiments of the present disclosure.

An embodiment of the present disclosure further provides an electrostatic interference processing device. Refer to FIG. 7. FIG. 7 is a schematic structural diagram of an electrostatic interference processing device according to the embodiments of the present disclosure. The electrostatic interference processing device may include:
- a memory 71, configured to store a computer program; and
- a processor 72, configured to implement the following operations when executing a computer program stored in the memory 71:
  receiving input data in real time, and determining whether an electrostatic interference signal is present in the input data; in response to determining that the electrostatic interference signal is present in the input data, interrupting reception of the input data; determining whether an interference frequency of the electrostatic interference signal is lower than a preset value; and in response to determining that the interference frequency of the electrostatic interference signal is lower than the preset value, continuing to receive the input data.

An embodiment of the present disclosure further provides a readable storage medium, where the readable storage medium has a computer program stored therein, and the computer program, when executed by a processor, may implement the following operations:
  receiving input data in real time, and determining whether an electrostatic interference signal is present in the input data; in response to determining that the electrostatic interference signal is present in the input data, interrupting reception of the input data; determining whether an interference frequency of the electrostatic interference signal is lower than a preset value; and in response to determining that the interference frequency of the electrostatic interference signal is lower than the preset value, continuing to receive the input data.

The readable storage medium may include: any medium that may store program code, such as a USB flash drive, a removable hard disk, a Read-Only Memory (ROM), a Random Access Memory (RAM), a magnetic disk, or an optical disc.

For the descriptions of parts related to an electrostatic interference processing apparatus and device, and a computer-readable storage medium according to embodiments of the present disclosure, reference may be made to the detailed descriptions of the corresponding parts of an electrostatic interference processing method according to the embodiments of the present disclosure. Details are not described herein.

It should be noted that in this specification, relational terms such as first and second are used only to differentiate an entity or operation from another entity or operation, and do not necessarily require or imply that any actual relationship or sequence exists between these entities or operations. Terms "comprise", "include", or any other variations thereof are intended to cover a non-exclusive inclusion, such that a process, a method, an article or a device including a list of elements includes elements inherent to such process, method, article or device. In absence of more constraints, an element preceded by "includes a . . . " does not preclude the existence of other identical elements in the process, method, article, or terminal device that includes the element. In addition, the parts of the above technical solutions according to the embodiments of the present disclosure that share the implementation principle of the corresponding technical solutions in the related art are not described in detail, so as to avoid redundant description.

The foregoing descriptions of the disclosed embodiments enable persons having ordinary skill in the art to implement or use the present disclosure. Multiple modifications to these embodiments are obvious to persons having ordinary skill in the art, and the general principles defined herein may be implemented in other embodiments without departing from the spirit or scope of the present disclosure. Therefore, the present disclosure will not be limited to the embodiments described herein, but will follow the widest scope identical to the principles and novel features disclosed herein.

What is claimed is:

1. An electrostatic interference processing method, comprising:
  receiving input data in real time, and determining whether an electrostatic interference signal is present in the input data;
  in response to determining that the electrostatic interference signal is present in the input data, interrupting reception of the input data, and determining whether an interference frequency of the electrostatic interference signal is lower than a preset value; and
  in response to determining that the interference frequency of the electrostatic interference signal is lower than the preset value, continuing to receive the input data, wherein
  after continuing to receive the input data, the method further comprises:
  determining whether the electrostatic interference signal in the input data causes a processor to fall into an infinite loop, and in response to determining that the electrostatic interference signal in the input data causes the processor to fall into the infinite loop, controlling the processor to reset so as to exit the infinite loop;
  determining whether the interference frequency of the electrostatic interference signal is lower than the preset value comprises:
  setting a current counting time of a timer to 0, and reading a set of the input data;
  reading a next set of the input data when the current counting time is equal to a preset time interval;
  determining whether two adjacent sets of the input data read are the same;
  in response to determining that the two adjacent sets of the input data are different, returning to the operation of setting the current counting time of the timer to 0; and
  in response to determining that the two adjacent sets of the input data are the same, determining whether the current counting time is less than a preset multiple of the preset time interval;
  in response to determining that the current counting time is less than the preset multiple of the preset time interval, when the current counting time is equal to an integer multiple of the preset time interval, returning to the operation of reading the next set of the input data; and
  in response to determining that the current counting time is not less than the preset multiple of the preset time interval, determining that the interference frequency of the electrostatic interference signal is lower than the preset value.

2. The electrostatic interference processing method according to claim 1, wherein the method further comprises the following operations performed in response to determining that the electrostatic interference signal in the input data does not cause the processor to fall into the infinite loop:
determining whether the electrostatic interference signal in the input data causes an error in a data bit of a memory; and
in response to determining that the electrostatic interference signal in the input data causes an error in the data bit of the memory, calibrating the memory.

3. The electrostatic interference processing method according to claim 2, wherein after controlling the processor to reset so as to exit the infinite loop, the method further comprises:
proceeding to the operation of determining whether the electrostatic interference signal in the input data causes an error in the data bit of the memory.

4. The electrostatic interference processing method according to claim 2, wherein determining whether the electrostatic interference signal in the input data causes the error in the data bit of the memory comprises:
performing parity check on storage bits of the memory by using a parity check method to determine whether the electrostatic interference signal interferes with the memory and causes the error in the data bit of the memory.

5. The electrostatic interference processing method according to claim 1, wherein determining whether the electrostatic interference signal in the input data causes the processor to fall into the infinite loop comprises:
determining whether the current counting time of the timer varies; in response to determining that the current counting time of the timer varies, determining that the electrostatic interference signal does not cause the processor to fall into the infinite loop; and in response to determining that the current counting time of the timer does not vary, determining that the electrostatic interference signal causes the processor to fall into the infinite loop.

6. The electrostatic interference processing method according to claim 1, wherein the input data is control signal data.

7. The electrostatic interference processing method according to claim 1, wherein
determining whether an electrostatic interference signal is present in the input data comprises: obtaining, by an interference detector, the input data received by the server; and detecting whether the electrostatic interference signal is present in the input data by the interference detector; and
in response to determining that the electrostatic interference signal is present in the input data, interrupting reception of the input data comprises: in response to determining that the electrostatic interference signal is present in the input data, sending, by the interference detector, the input data to relevant chips of the processor of the server for processing.

8. The electrostatic interference processing method according to claim 7, wherein the interference detector comprises a peripheral circuit of the processor or an internal circuit of the processor.

9. The electrostatic interference processing method according to claim 1, further comprising:
in response to determining that the interference frequency of the electrostatic interference signal is not lower than the preset value, terminating reception of the input data.

10. The electrostatic interference processing method according to claim 1, wherein the interference frequency of the electrostatic interference signal is the number of electrostatic interference signals per unit time.

11. The electrostatic interference processing method according to claim 1, wherein determining whether the electrostatic interference signal in the input data causes the processor to fall into the infinite loop comprises:
when the processor is not in the infinite loop before the server continues to receive the input data, but falls into the infinite loop after the server continues to receive the input data, determining that the electrostatic interference signal in the input data causes the processor to fall into the infinite loop.

12. The electrostatic interference processing method according to claim 1, wherein controlling the processor to reset so as to exit the infinite loop comprises:
sending a reset signal by using a reset circuit to force the processor to reset, so that the processor exits the infinite loop and returns to normal operation.

13. An electrostatic interference processing device, comprising:
a memory, configured to store a computer program; and
a processor, configured to implement the following operations when executing the computer program:
receiving input data in real time, and determining whether an electrostatic interference signal is present in the input data;
in response to determining that the electrostatic interference signal is present in the input data, interrupting reception of the input data, and determining whether an interference frequency of the electrostatic interference signal is lower than a preset value; and
in response to determining that the interference frequency of the electrostatic interference signal is lower than the preset value, continuing to receive the input data, wherein
after continuing to receive the input data, the method further comprises:
determining whether the electrostatic interference signal in the input data causes a processor to fall into an infinite loop, and in response to determining that the electrostatic interference signal in the input data causes the processor to fall into the infinite loop, controlling the processor to reset so as to exit the infinite loop;
determining whether the interference frequency of the electrostatic interference signal is lower than the preset value comprises:
setting a current counting time of a timer to 0, and reading a set of the input data;
reading a next set of the input data when the current counting time is equal to a preset time interval;
determining whether two adjacent sets of the input data read are the same;
in response to determining that the two adjacent sets of the input data are different, returning to the operation of setting the current counting time of the timer to 0; and
in response to determining that the two adjacent sets of the input data are the same, determining whether the current counting time is less than a preset multiple of the preset time interval;
in response to determining that the current counting time is less than the preset multiple of the preset time interval, when the current counting time is equal to an integer multiple of the preset time interval, returning to the operation of reading the next set of the input data; and in response to determining that the current counting time is not less than the preset multiple of the preset time interval, determining that the interference frequency of the electrostatic interference signal is lower than the preset value.

14. The electrostatic interference processing device according to claim 13, wherein the processor is further configured to implement the following operations in response to determining that the electrostatic interference signal in the input data does not cause the processor to fall into the infinite loop:
determining whether the electrostatic interference signal in the input data causes an error in a data bit of a memory; and
in response to determining that the electrostatic interference signal in the input data causes an error in the data bit of the memory, calibrating the memory.

15. The electrostatic interference processing device according to claim 14, wherein the processor is further configured to implement the following operations after controlling the processor to reset so as to exit the infinite loops:
proceeding to the operation of determining whether the electrostatic interference signal in the input data causes an error in the data bit of the memory.

16. The electrostatic interference processing device according to claim 13, wherein determining whether the electrostatic interference signal in the input data causes the processor to fall into the infinite loop comprises:
determining whether the current counting time of the timer varies; in response to determining that the current counting time of the timer varies, determining that the electrostatic interference signal does not cause the processor to fall into the infinite loop; and in response to determining that the current counting time of the timer does not vary, determining that the electrostatic interference signal causes the processor to fall into the infinite loop.

17. The electrostatic interference processing device according to claim 13, wherein the input data is control signal data.

18. The electrostatic interference processing device according to claim 13, further comprising an interference detector, wherein
the interference detector is configured to obtain the input data received by the server, and detect whether the electrostatic interference signal is present in the input data; and in response to determining that the electrostatic interference signal is present in the input data, send the input data to relevant chips of the processor of the server for processing.

19. The electrostatic interference processing device according to claim 18, wherein the interference detector comprises a peripheral circuit of the processor or an internal circuit of the processor.

20. A a non-transitory computer-readable storage medium, wherein the non-transitory computer-readable storage medium has a computer program stored therein, and the computer program, when executed by a processor, causes the processor to implement the following operations:
receiving input data in real time, and determining whether an electrostatic interference signal is present in the input data;
in response to determining that the electrostatic interference signal is present in the input data, interrupting reception of the input data, and determining whether an interference frequency of the electrostatic interference signal is lower than a preset value; and
in response to determining that the interference frequency of the electrostatic interference signal is lower than the preset value, continuing to receive the input data, wherein
after continuing to receive the input data, the method further comprises:
determining whether the electrostatic interference signal in the input data causes a processor to fall into an infinite loop, and in response to determining that the electrostatic interference signal in the input data causes the processor to fall into the infinite loop, controlling the processor to reset so as to exit the infinite loop;
determining whether the interference frequency of the electrostatic interference signal is lower than the preset value comprises:
setting a current counting time of a timer to 0, and reading a set of the input data;
reading a next set of the input data when the current counting time is equal to a preset time interval;
determining whether two adjacent sets of the input data read are the same;
in response to determining that the two adjacent sets of the input data are different, returning to the operation of setting the current counting time of the timer to 0; and
in response to determining that the two adjacent sets of the input data are the same, determining whether the current counting time is less than a preset multiple of the preset time interval;
in response to determining that the current counting time is less than the preset multiple of the preset time interval, when the current counting time is equal to an integer multiple of the preset time interval, returning to the operation of reading the next set of the input data; and
in response to determining that the current counting time is not less than the preset multiple of the preset time interval, determining that the interference frequency of the electrostatic interference signal is lower than the preset value.

* * * * *